United States Patent
Greinke

(12) 
(10) Patent No.: US 6,669,919 B1
(45) Date of Patent: Dec. 30, 2003

(54) INTERCALATED GRAPHITE FLAKES EXHIBITING IMPROVED EXPANSION CHARACTERISTICS AND PROCESS THEREFOR

(75) Inventor: Ronald Alfred Greinke, Medina, OH (US)

(73) Assignee: Advanced Energy Technology Inc., Wilmington, DE (US)

(*) Notice: Subject to any disclaimer, the term of this patent is extended or adjusted under 35 U.S.C. 154(b) by 223 days.

(21) Appl. No.: 09/714,077

(22) Filed: Nov. 16, 2000

(51) Int. Cl.$^7$ ............................................. C01B 31/04

(52) U.S. Cl. ..................................................... 423/448

(58) Field of Search ........................................ 423/448

(56) References Cited

U.S. PATENT DOCUMENTS

| | | | |
|---|---|---|---|
| 3,404,061 A | 10/1968 | Shane et al. | 161/125 |
| 4,350,576 A | 9/1982 | Watanabe et al. | 204/101 |
| 4,895,713 A | 1/1990 | Greinke et al. | 423/448 |
| 5,149,518 A | 9/1992 | Mercuri et al. | 423/449 |
| 5,173,515 A | 12/1992 | Von Bonin et al. | 521/103 |
| 5,186,919 A * | 2/1993 | Bunnell | 423/448 |
| 5,376,450 A | 12/1994 | Greinke et al. | 428/402 |
| 5,503,717 A | 4/1996 | Kang et al. | 205/478 |
| 5,582,811 A | 12/1996 | Greinke et al. | 423/265 |
| 5,698,088 A | 12/1997 | Kang et al. | 205/555 |

FOREIGN PATENT DOCUMENTS

| | | | |
|---|---|---|---|
| EP | 0596801 | 5/1994 | C01B/31/00 |
| JP | 6369705 | 3/1988 | C01B/31/04 |
| JP | 1160609 | 6/1989 | B28B/3/12 |
| JP | 2188418 | 7/1990 | C01B/31/04 |
| JP | 5221624 | 8/1993 | C01B/31/04 |
| RO | 114887 B | 8/1999 | C01B/31/04 |
| RU | 1657474 | 6/1991 | C01B/31/04 |
| RU | 1765114 | 9/1992 | C01B/31/04 |
| RU | 1577244 | 3/1995 | C01B/31/04 |
| RU | 1817438 | 3/1995 | C01B/31/04 |
| RU | 2118941 | 9/1998 | C01B/31/04 |

OTHER PUBLICATIONS

Materials Research Bulletin 35, 2000, pp. 425–430; "On Lower–Nitrogen Expandable Graphite", by Song, Kemin, Dun Huijuan.

1999 Joint International Meeting, Honolulu, Hawii, Oct. 17–22, 1999, Meeting Abstracts, Battery Div., "Study of the Lithium Intercalation Process in Mechanically Milled Graphite", Ong & Yang.

International Symposium of Carbon, 1998 (Tokyo), "Intercalation and Exfoliation of Graphite at Room Temperature", Mittal & Inagaki.

Tanso 1997, No. 180, pp. 239–244, "Preparation of Alkali Metal–Graphite Intercalation Compounds in Tetrahydrofuran Type of Solvents", Mizutani et al.

Carbon vol. 35, No. 8, pp. 1089–1096, 1997, "Electrochemical Synthesis and Characterization of Formic Acid–Graphite Intercalation Compound", Kang et al.

Inorganic Materials, vol. 33, No. 6, 1997, pp. 584–587, "Synthesis of Interclation Compounds in the System Graphite $HNO_3$–$H_2SO_4$", Avdeev et al.

Inorganic Materials, vol. 33, No. 6, 1997, pp. 580–583, "Intercalation of Sulfuric Acid into Graphite in the Presence of Gaseous Oxidizers and Oleum", Avdeev et al.

Carbon vol. 35, No. 4, pp. 563–566, 1997, "A Novel Type of Reaction in the Chemistry of Graphite Intercalation Compounds. The Preparation of Alkali Metal Graphite Intercalation Compounds by Ion Exchange Reactions", Isaev et al.

Carbon vol. 35, No. 2, pp. 285–290, 1997, Formation of Iron Chloride–Graphite Intercalation Compounds in Propylene Carbonate by Electrolysis, Zhang et al.

Carbon vol. 35, No. 1, pp. 61–65, 1997, "Graphite Intercalation Compounds Prepared in Solutions of Alkali Metals in 2–Methyltetrahydrofuran and 2,5–Dimethyltetrahydrofuran", Mizutani et al.

Carbon vol. 34, No. 12, Letter to the Editor, "Preparation of Lower–Sulfur Content and Expandable Graphite", Chen et al., 1996.

Journal Electrochem Society, vol. 143, No. 11, 1996, "Structure and Lithium Intercalation Properties of Synthetic and Natural Graphite", Shi et al.

The European Carbon Conference "Carbon 96"—Newcastle, UK, Jul. 1996, "Direct Thermooxidative Conversion of Graphite to Exfoliated Graphite. The Way to Novel Technologies", Savoskin et al.

Journal Phys. Chem Solids, vol. 57, Nos. 6–8, pp. 925–930, 1996, "Ternary Graphite Intercalation Compounds of Type $M(NH_3)_xC_y$ Me=Be, Mg, Al, Sc, Y, La. Electrochemical Synthesis, Stability and NMR Studies", Stumpp et al.

Journal Phys. Chem Solids, vol. 57, Nos. 6–8, pp. 883–888, 1996, "Electrochemical Synthesis of Sulfate Graphite Intercalation Compounds with Different Electrolyte Concentrations", Kang et al.

Journal Phys. Chem Solids, vol. 57, Nos. 6–8, pp. 783–786, 1996, Debye–Waller Factors of ICI–Graphite Intercalation Compounds Prepared From Natural Graphite Flakes and Graphitized Polymide Films, Abe et al.

(List continued on next page.)

Primary Examiner—Stuart L Hendrickson
(74) Attorney, Agent, or Firm—Waddy & Patterson, P.C.; James R. Cartiglia

(57) ABSTRACT

A method for providing intercalated graphite flake with improved exfoliation characteristics, specifically, improved expansion pressure, is presented. The method includes treating graphite flakes with an oxidizing intercalant solution to provide intercalated graphite flakes; washing the intercalated graphite flakes; and adding a surfactant to the washed graphite flakes. The invention also includes the intercalated graphite flakes thusly prepared.

15 Claims, No Drawings

OTHER PUBLICATIONS

Carbon '94, Jul. 3–8, 1994, Granada, Spain, Extended Abstracts and Programme, The University of Granada, "Synthesis of $FeCl_3$–GIC Using Electrochemical Method in an Aqueous Solution", Kang et al.

Carbon, vol. 31, No. 8, 1993, Printed in Great Britain, Letters to the Editor, "Room Temperature Exfoliation of Graphite Under Microgravity".

X Symposium Przemyslu Elektrodowego, Extended Abstracts, "Preparation of Flexible Graphite From Czech Natural Graphite" Tomanova et al.

Carbon, vol. 31, No. 7, pp. 1131–1137, 1993, "Intercalation of Perfluorobutanesulfonic Acid in Graphite", Ruisinger et al.

Carbon, vol. 31, No. 5, pp. 777–781, 1993, "Intercalation of $AlCl_3$, Into $FeCl_3$–Graphite Intercalation Compounds and Occurence of Bi–Intercalation", Inagaki et al.

Carbon, vol. 31, No. 1, pp. 201–204, 1993, "Laser–Assisted Exfoliation of Potassium–Ammonia–Graphite Intercalation Compounds", Kuga et al.

American Carbon Society, Twentieth Biennial Conference on Carbon, Jun. 23–28, 1991, Extended Abstracts and Program, "Electrochemical Preparation of Metal–Ammonia Graphite Intercalation Compounds in Liquid Ammonia", Stumpp et al.

American Carbon Society, Twentieth Biennial Conference on Carbon Jun. 23–28 1991, Extended Abstracts and Program, "Preparation of New Graphite Intercalation Compounds in Anhydrous Hydrogen Fluoride", Selig et al.

Carbon, vol. 30, No. 2, pp. 207–212, 1992, "Intercalation Process in the Ternary System of $FeCl_3$–$NiCl_2$–KCl", Ohira et al.

Carbon, vol. 29, No. 8, pp. 1227–12131, 1991, "Exfoliated Graphite From Various Intercalation Compounds", Yoshida et al.

Carbon, vol. 29, Nos. 4/5, pp. 595–597, 1991, "Upon the Intercalation of Rhenium Heptoxide and Rhenium Trioxide Nitrate into Graphite", Scharff et al.

International Carbon Conference, Paris, 1990, "Study of Dissociation and Exfoliation of Graphite–Nitrate", Petitjean et al.

Carbon, vol. 28, No. 1, pp. 119–123, 1990, "Electrochemical Preparation Of The Graphite Bi–Intercalation Compound With $H_2SO_4$ And $FeCl_3$", Shioyama et al.

Synthetic Metals, 34, 1989, 145–150, "The Formation of Graphite Intercalation Compounds From Trichloroacetic Acid and Trichloroaetic Acid Chlorid Solutions Containing Molybdenum Compounds", Schulz et al.

Synthetic Metals, 34, 1989, 139–144, Potential Survey of Intercalation of Sulfuric Acid Into Graphite by Chemical Oxidation, Iwashita et al.

Synthetic Metals, 34, 1989, 73–78, Preparation of Metal Halide Graphite Intercalation Compounds by Intercalate Exchange, Stump et al.

Synthetic Metals, 26, 1988, 41–47, Electrochemical Synthesis of Graphite Intercalation Compounds with Nickel and Hydroxides, Inagaki et al.

Synthetic Metals, 25, 1988, 181–187, "Formation of Metal Chloride–Graphite Intercalation Compounds in Molten Salts", Wang et al.

Synthetic Metals, 20, 1987, 9–13, The Synthesis of $NiCl_2FeCl_3$–Graphite Intercalation Compounds, Inagaki et al.

Synthetic Metals, 20, 1987, 1–8, Synthesis of Cupric Chloride–Graphite Intercalatioin Compounds by the Molten Salt Method, Inagaki et al.

Journal of Chine University of Science and Technology, vol. 28, No. 2, 1998, "Chemical Preparation and Characterization of Expansible Graphite by H202 Oxidation", Chen, Zuyao.

Carbon, vol. 24, No. 6, pp. 731–735, 1986, "Etude de L'Exfoliation des Composes D'Insertion Graphite–Trioxyde de Soufre", Klatt et al.

Carbon '86, Proceedings, Jun. 30–Jul. 4, 1986, "Studies on the Exfoliation Mechanism of Intercalated Graphite Flakes", Mathur et al.

Tanso, No. 123, 1985, pp. 160–165, "Preparation of Exfoliated Graphite from Alkaline Metal–Graphite–Tetrahydrofurane Ternary Compounds", Inagaki et al.

Carbon, vol. 23, No. 5, pp. 595, 1995, "Intercalation of Graphite with Antimony Tetrachloride Fluoride".

Tanso, No. 121, 1985, pp. 65–69, "Synthesis of Strontium–Graphite Intercalation Compounds", Akuzawa et al.

American Carbon Society and Unversity of Kentucky, Jun. 16–21, 1985, Extended Abstracts and Program, "Reaction of Chloroacids with Graphite", Stumpp et al.

Viniti 2071–81, 8 pgs., "Production of Expanded Graphite", Komarova et al., 1981.

Journal of Applied Electrochemistry 13, 1983, pp. 147–155, "The Electrochemical Formation of Graphite–Bisulphate Intercalation Compounds", Berlouis et al.

Carbon, vol. 21, No. 3, pp. 181–188, 1983, "Intercalation by $(SO_3F)_2$ in Various Forms of Graphite and Boron Nitride", Hooley.

American Carbon Society, Jul. 18–22, 1983, Extended Abstracts and Program, "Structure and Intercalation of Natural Flake Graphite", Murdie et al.

Journal of Materials Science 20, 1985, pp. 171–181, "Intercalation of Natural Flake Graphites", Murdie et al.

* cited by examiner

INTERCALATED GRAPHITE FLAKES EXHIBITING IMPROVED EXPANSION CHARACTERISTICS AND PROCESS THEREFOR

TECHNICAL FIELD

This present invention relates to intercalated graphite flakes having improved expansion characteristics when exposed to elevated temperatures, and a process for preparing such flakes.

Intercalated graphite flake has many useful applications. One common application is to exfoliate the intercalated graphite particles into vermicular-like structures that are then compressed into sheets conventionally referred to as flexible graphite, for use in the manufacture of products such as gaskets, thermal management materials or fuel cell components. Intercalated graphite flake is also used in a variety of products that take advantage of the expansion characteristics of intercalated graphite flake when exposed to high temperature. Examples of such uses include using the intercalated flake in combination with polymer foams to form seat cushions and furniture upholstery in aircraft and incorporation of the flake in resin-based coatings for wallboards, lumber and other construction materials. Upon exposure to fire, the high temperature will cause the particles of intercalated graphite to exfoliate which minimizes or prevents the formation of toxic gases from the polymer foam and may, of itself, smother a fire.

Since it is important to suppress, i.e. retard, a fire before it has begun to spread, it would be a substantial advantage for an intercalated graphite flake product to exhibit a very high degree of exfoliation upon exposure to temperatures as low as 600° C. and even lower. Moreover, since in some applications the graphite flake is incorporated in another material, such as a polymer foam or a resin, the foam or resin can tend to physically inhibit expansion, i.e., there is a load on the flake when it expands. In such circumstances, not only is the degree of expansion important, so is the expansion pressure. Insufficient expansion pressure will result in reduced expansion under the load to which the flake is subjected, reducing the fire-suppression effectiveness of the intercalated graphite flake.

It has been discovered in accordance with the present invention that the treatment of intercalated graphite flake with surfactant, following intercalation of the graphite flake with an oxidizing intercalant solution results in a material which exhibits enhanced exfoliation characteristics, such as expansion pressures, at exfoliation temperatures as low as 600° C. and even lower.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional e.g. thermal and electrical conductivity and fluid diffusion.

Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Particles, or flakes, of graphite can be treated by a process referred to as intercalation to form intercalated graphite flake whereby, after exposure to elevated temperatures, the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

SUMMARY OF THE INVENTION

The present invention provides a method for forming particles of intercalated graphite flake having enhanced exfoliation characteristics, specifically, expansion pressure, at temperatures as low as 600° C. and even lower by treating particles of graphite with an oxidizing intercalant solution to provide intercalated graphite flake; washing the intercalated graphite flake; and thereafter contacting the intercalated graphite flake with a surfactant.

DETAILED DESCRIPTION OF THE INVENTION

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite" or intercalated graphite flake. Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes. Alternatively, the intercalated graphite flake can itself be used in, e.g., fire or flame retardant compositions or coatings.

Graphite starting materials suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than six weight percent. More preferably, the graphite employed for the present invention will have a purity of at least about 99%. In the most preferred embodiment, the graphite employed will have a purity of at least about 99.9%.

A common method for manufacturing particles of intercalated graphite is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent. The quantity of intercalation solution may range from about 20 to about 150 pph and more typically about 50 to about 120 pph.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_nCOOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1,4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After the flakes are intercalated, any excess solution is drained from the flakes and the flakes are washed, specifically water-washed.

After being water-washed, a surfactant is then added to the intercalated graphite flakes, such as by coating, spraying or applying the surfactant on the flakes. By surfactant is meant a surface-active agent capable of reducing interfacial tension between a liquid and a solid, such as a wetting agent. Particularly useful surfactants in the practice of the present invention include hexadecanol; lignins, such as lignin sulfonates like sodium lignosulfonate, commercially available as Marasperse N-22 from Lignotech USA, Inc. of Rothschild, Wis.; glycols, such as nonylphenol polyethylene glycol ether, commercially available as Tergitol NP-10 from Union Carbide Chemicals and Plastics Company Inc. of Danbury, Conn.; and organosilicones like polyalkyleneoxide modified polydimethylsiloxane, commercially available as Silwet L-7200 from OSi Specialites, Inc. of Danbury, Conn. Typically, the surfactant is added to the intercalated flakes at a level of about 0.25 to about 5 pph.

Upon exposure to high temperature, e.g. about 600° C. to 1000° C. and higher, the particles of intercalated graphite expand as much as about 80 to 1000 or more times its original volume in an accordion-like fashion in the c-direction, i.e. in the direction perpendicular to the crystalline planes of the constituent graphite particles. Indeed, expansion of the graphite particles can be initiated at temperatures as low as about 150° C., which is particularly useful in fine suppression applications are therefore commonly referred to as worms. The worms may be compressed together into flexible sheets that, unlike the original graphite flakes, can be formed and cut into various.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A method for providing intercalated graphite flake with improved exfoliation characteristics, comprising: (i) treating graphite flakes with an oxidizing intercalant solution to provide intercalated graphite flakes; (ii) washing the intercalated graphite flakes; (iii) adding a surfactant to the washed graphite flakes; and (iv) exposing the graphite flakes to an expansion aid applied prior to, during or immediately after treatment with the oxidizing intercalant solution, wherein said expansion aid is selected from the group consisting of carboxylic acids consisting of carbon, hydrogen, and oxygen atoms; alkyl esters; naphthoic acids; anthranilic acid; p-aminobenzoic acid; acetoacetoamidobenzoic acids; acetamidobenzoic acids; anhydrides of the aforementioned acids; and mixtures thereof.

2. The method of claim 1 wherein the surfactant comprises hexadecanol, lignins, glycols, organosilicones or mixtures thereof.

3. The method of claim 2 wherein the surfactant comprises sodium lignosulfonate.

4. The method of claim 2 wherein the surfactant comprises nonylphenol polyethylene glycol ether.

5. The method of claim 2 wherein the surfactant comprises polyalkyleneoxide modified polydimethylsiloxane.

6. The method of claim 1 wherein the surfactant is added to the washed graphite flakes at a level of about 0.25 to about 5 pph.

7. The method of claim 1 wherein the oxidizing intercalant solution comprises a mixture of nitric acid and sulfuric acid.

8. The method according to claim 1 wherein said intercalant solution comprises a mixture of sulfuric acid and an oxidizing agent, wherein said oxidizing agent comprises at least one of nitric acid, perchloric acid, chromic acid, potassium permanganate, hydrogen peroxide, iodic acids, or periodic acids.

9. The method of claim 1 wherein the expansion aid comprises an organic material sufficiently soluble in the oxidizing intercalant solution to achieve an enhanced expansion pressure.

10. The method of claim 1 wherein the expansion aid comprises a carboxylic acid.

11. The method according to claim 1 further comprising exfoliating said washed graphite flake after said adding said surfactant.

12. The method according to claim 11 wherein said exfoliating comprises heating said washed graphite flake to a temperature of at least about 150° C.

13. The method according to claim 1 wherein said carboxylic acids consisting of carbon, hydrogen, and oxygen atoms are selected from aliphatic, cycloaliphatic, straight chain, branched chain, saturated, unsaturated monocarboxylic acids, dicarboxylic acids or polycarboxylic acids.

14. The method according to claim 1 wherein said carboxylic acids consisting of carbon, hydrogen, and oxygen atoms are selected form formic acid, oxalic acid, fumaric acid, malonic acid, maleic acid, succinic acid, glutaric acid, adipic acid, 1,5-pentanedicarboxylic acid, 1,6-hexandedicarboxylic acid, 1,10-decanedicarboxylic acid, cyclohexane-1,4-dicarboxylic acid, phthalic acid, terephthalic acid, cyclohexane carboxylic acid, benzoic acid, naphthoic acid, anthranilic acid, p-aminobenzoic acid, salibylic acid, o-, m-and p-tolyly acids, methoxybenzoic acid, ethoxybenzoic acids, phenylacetic acid, hydroxybenzoic acid, citric acid, and mixtures thereof.

15. The method according to claim 1 wherein said exposing the graphite flakes to an expansion aid occurs prior to or during treatment with the oxidizing intercalant solution and said expansion aid further comprises an organic solvent to improve solubility of said expansion aid in said intercalant solution.

\* \* \* \* \*